United States Patent Office 3,539,585
Patented Nov. 10, 1970

3,539,585
4-HYDROXY-2-THIAZOLINE-5-ALKANOIC ACIDS
Theodore S. Sulkowski, Wayne, and Albert A. Mascitti, Norristown, Pa., assignors to American Home Products Corporation, New York, N.Y., a corporation of Delaware
No Drawing. Filed Oct. 3, 1968, Ser. No. 764,967
Int. Cl. C07d 91/24
U.S. Cl. 260—306.7
3 Claims

ABSTRACT OF THE DISCLOSURE

This invention concerns 4-hydroxy-2-thiazoline-5-alkanoic acids which are pharmacologically efficacious as anti-inflammatory agents. Further, these compounds are useful intermediates in the preparation of their corresponding 5-thiazolealkanoic acids.

---

This invention relates to new and novel nitrogen and sulfur containing heterocyclic compounds. In particular, it concerns 4-hydroxy-2-thiazoline-5-alkanoic acids which in standard and accepted pharmacological tests have exhibited usefulness as anti-inflammatory agents. Further, the compounds of this invention are useful intermediates in the preparation of pharmodynamically active 5-thiazolealkanoic acids.

The new and novel compounds within the purview of the present invention are depicted by the following formula:

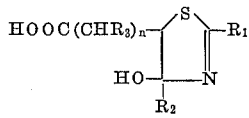

wherein $R_1$ and $R_2$ are selected from the group consisting of phenyl, lower alkylphenyl, lower alkoxyphenyl, halophenyl, di(lower) alkylaminophenyl, nitrophenyl, aminophenyl, trifluoromethylphenyl, thienyl, furyl, and naphthyl; $R_3$ is selected from the group consisting of hydrogen and lower alkyl; and $n$ is an integer from 0 to 2. As employed herein the terms "lower alkyl," "lower alkoxy" and the like are meant to include both branched and straight chain moieties having from one to about five carbon atoms. Typical examples thereof are: 4-(p-chlorophenyl) - 4 - hydroxy - 2 - phenyl - 2 - thiazoline-5-acetic acid and 4-hydroxy-2-phenyl-4-($\alpha,\alpha,\alpha$-trifluoro-p-tolyl)-2-thiazoline-5-acetic acid.

The 4-hydroxy-2-thiazoline-5-alkanoic acids of the present invention may be prepared by the process which is illustrated by the following reaction scheme:

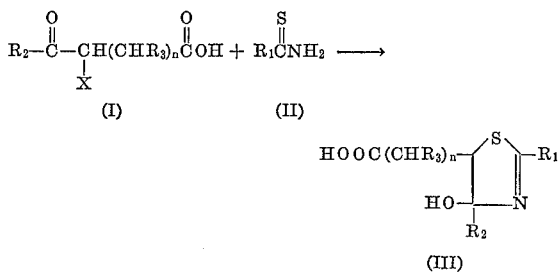

wherein $R_1$, $R_2$, $R_3$ and $n$ are defined as above. The reaction is effected by contacting equimolar amounts of a $\omega$-aroyl-$\omega$-haloalkanoic acid (I) and sodium carbonate in isopropanol and heating the resulting mixture to a temperature range of about 60° C. to about 70° C. Thereafter, an equimolar quantity of an appropriate thioamide (II) is added thereto and the reaction mixture is maintained at the above temperature for about an additional half-hour. Subsequently, the mixture is allowed to stand at ambient temperatures for about twenty hours.

The resulting 4-hydroxy-2-thiazoline-5-alkanoic acid (III) is separated by conventional procedures. For example, the solid product is recovered by filtration and the filtrate is then acidified to precipitate additional product. The starting compounds employed in the above reaction (I and II) are either commercially available or are readily prepared by organic procedures well known in the art. For example, the $\omega$-aroyl-$\omega$-haloalkanoic acids (I) may be prepared by the Friedel-Crafts reaction of an appropriate succinic or glutaric anhydride and an aryl compound which is then followed by a halogenation reaction.

When the 4-hydroxy-2-thiazoline-5-alkanoic acids or the present invention are employed as intermediates to prepare their corresponding 5-thiazolealkanoic acid, they may be dehydrated by the hereinafter depicted reaction sequence:

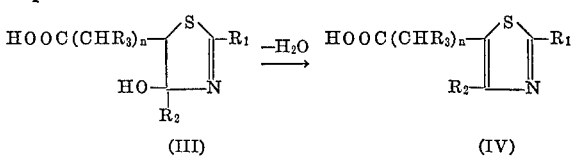

wherein $R_1$, $R_2$, and $R_3$ and $n$ are defined as above. The dehydration reaction is effected by refluxing a 4-hydroxy-2-thiazoline-5-alkanoic acid (III), in the presence of a sulfonic acid e.g., benzene sulfonic acid and toluene sulfonic acid in a flask equipped with a water separator until water ceases to evolve.

When the reaction is complete, the resulting 5-thiazolealkanoic acid (IV) is recovered by standard techniques e.g., the reaction mixture is evaporated to dryness and the residue recrystallized from a suitable solvent e.g., an alkanol. These 5-thiazolealkanoic acids (IV) are described and claimed in copending U.S. patent application, Ser. No. 679,999, filed Nov. 2, 1967, entitled "2,4-diarylthiazoles" by Kevan Brown. These 5-thiazolealkanoic acids (IV) are useful anti-inflammatory agents when tested by the procedures described by Winter et al. in Proc. Soc. Exp. Biol. Med. III, 544 (1962); Buttle et al. in Nature 179, 629 (1957); Konzett and Rossler in Arch. Path. Parmac. 195, 71 (1940) and Newbould in Brit, Journ. Pharm. Chemoth. 21, 127–137 (1963).

The new and novel 4-hydroxy-2-thiazoline-5-alkanoic acids (III) of the present invention have been also found to possess interesting pharmacological properties. More particularly, these compounds in standard pharmacological tests, exhibit the ability to inhibit experimentally induced edema in rats and, therefore, are useful as anti-inflammatory agents.

In the pharmacological evaluation of the anti-inflammatory compounds of this invention the in vivo effects of these compounds are tested by the hereinafter described procedure which is an adaptation of the tests described by Winter et al. in the Proc. Soc. Exp. Biol. and Med. III: 544, 1962 and by Buttle et al. in Nature 179:629 1957. The procedure employed is: Anti-inflammatory activity of a test compound is assessed by its ability to inhibit experimentally-induced edema in the hind paw of male Sprague-Dawley rats weighing 120–165 grams. The compound is administered orally as a solution or suspension in physiological saline (plus 1 drop Tween 80) in a volume of 10 ml./kg. at various concentrations. Each compound is given to six rats and vehicle alone is administered to six other rats as a control. Thirty minutes after drug administration edema is induced by an injection of 0.05 of a 1% carrageenin solution in saline into the subplantar tissue of the rat's right hind paw. Paw volume is then immediately measured volumetrically with a plethysmograph and again after three hours. The mean volume of swelling for the control group is calculated and compared to the test groups. Compounds that inhibit swelling approximately 20% as compared to controls are active. Inhibition is calculated by the formula:

Percent Inhibition $$= \frac{\text{Mean vol. swelling of control} - \text{mean vol. swelling of test}}{\text{Mean vol. swelling of control}} \times 100$$

The 4-hydroxy-2-thiazoline-5-alkanoic acids (III) of this invention in the above test when administered orally at a dosage range of about 10 to about 100 mg./kilo of animal body weight demonstrate a percent inhibition from about 30 to about 60 percent. In particular, when 4-(p-chlorophenyl) - 4 - hydroxy - 2 - phenyl-2-thiazoline-5-acetic acid is tested by this procedure it exhibited a fifty-seven percent inhibition when administered at a dosage of 30 mg./kilo of animal body weight.

When the 4 - hydroxy - 2-thiazoline-5-alkanoic acids (III) of this invention are employed as anti-inflammatory agents they may be administered to warm-blooded mammals, e.g., mice, rats, rabbits, dogs, cats, monkeys, etc. alone or in combination with pharmacologically acceptable carriers, the proportion of which is determined by the solubility and chemical nature of the compounds, chosen route of administration and standard biological practice. For example, they may be administered orally in the form containing such excipients as starch, milk sugar, and so forth. They may also be administered orally in the form of solutions or they may be injected parenterally. For parenteral administration they may be used in the form of a sterile solution containing other solutes, for example, enough saline or glucose to make the solution isotonic.

The dosage of these 4-hydroxy-2-thiazoline-5-alkanoic acids (III) will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following examples are given by way of illustration and are not to be construed as limitations of this invention, many variations of which are possible without departing from the scope and spirit thereof.

EXAMPLE I

A mixture of 94.5 g. of 3-bromo-3-(p-chlorobenzoyl) propionic acid, 34.3 g. of anhydrous sodium carbonate and 200 ml. of isopropanol are stirred and heated to 60–65° C. The temperature is maintained at this range while 44.3 g. of thiobenzamide is added in portions. After the addition is completed, the mixture is stirred and heated between 60–70° C. for an additional one-half hour then left standing at room temperature for eighteen hours. The resulting solid is filtered and suspended in water. The mixture is filtered to remove 10 g. of 4-(p-chlorophenyl)-4-hydroxy-2-phenyl-2 - thiazoline - 5 - acetic acid, M.P. 148–150° C. The aqueous filtrate is acidified with hydrochloric acid to precipitate an additional 48 g. of 4-(p-chlorophenyl) - 4 - hydroxy - 2 - phenyl-2-thiazoline-5-acetic acid, M.P. 148–150° C.

Analysis.—Calcd. for $C_{17}H_{14}ClNSO_3$ (percent): C, 58.70; H, 4.06; N, 4.03; Cl, 10.20; S, 9.22. Found (percent): C, 58.88; H, 4.02; N, 3.97; Cl, 9.84; S, 9.56.

The above prepared 4-(p-chlorophenyl)-4-hydroxy-2-phenyl-2-thiazoline-5-acetic acid (55 g.) is refluxed in toluene, in the presence of toluene sulfonic acid, (0.36 g.) in a flask equipped with a water separator until water ceases to evolve. Thereafter, the mixture is evaporated to dryness under vacuum and the residue recrystallized from ethanol to afford 4-(p-chlorophenyl)-2-phenyl-5-thiazoleacetic acid, M.P. 161–162° C.

Analysis.—Calcd. for $C_{17}H_{12}ClNO_2S$ (percent): C, 61.9; H, 3.7; N, 4.2; S, 9.7. Found (percent): C, 62.0; H, 3.7; N, 4.2; S, 9.8.

EXAMPLE II

A mixture of 11.5 g. of 3-bromo-3-($\alpha,\alpha,\alpha$-trifluoro-p-toluoyl) propionic acid, 3.7 g. of anhydrous sodium carbonate, 100 ml. of isopropanol and 4.7 g. of thiobenzamide are reacted as in Example I. This mixture is filtered, the filtrate is evaporated to dryness and an oily residue solidifies on standing. After recrystallization from aqueous ethanol, there is obtained 4-hydroxy-2-phenyl-4-($\alpha,\alpha,\alpha$-trifluoro-p-tolyl)-2-thiazoline-5-acetic acid, M.P. 160–1° C.

Analysis.—Calcd. for $C_{18}H_{14}F_3NSO$ (percent): C, 56.69; H, 3.70; N, 3.68. Found (percent): C, 56.68; H, 3.57; N, 3.70.

Repeating the procedure of Example I, the above prepared 4 - hydroxy - 2 - phenyl - 4 - ($\alpha,\alpha,\alpha$-trifluoro-p-tolyl)-2-thiazoline-5-acetic acid is converted to the corresponding 2 - phenyl-4-($\alpha,\alpha,\alpha$-trifluoro-p-tolyl)-5-thiazoleacetic acid, M.P. 168–9° C.

EXAMPLE III

A mixture of 95 g. of 3-bromo-3-(p-bromobenzoyl) propionic acid, 35 g. of anhydrous sodium carbonate and 200 ml. of ethanol are stirred and heated to 60–70° C. The temperature is maintained at this range while 45.0 g. of thiobenzamide is added in portions. After the addition is completed, the mixture is stirred and heated between 60–70° C. for an additional one-half hour then left standing at room temperature for twenty hours. The resulting solid is separated and suspended in water. The mixture is filtered to remove 4-(p-bromophenyl) - 4 - hydroxy-2-phenyl-2-thiazoline-5-acetic acid. Thereafter, the aqueous filtrate is acidified with hydrochloric acid to precipitate additional 4-(p-bromophenyl) - 4 - hydroxy-2-phenyl-2-thiazoline-5-acetic acid.

The above prepared 4-(p-bromophenyl)-4-hydroxy-2-phenyl-2-thiazoline-5-acetic acid is refluxed in benzene, in the presence of benzene sulfonic acid, in a flask equipped with a water separator until all the water is removed. The mixture is then evaporated to dryness and the residue recrystallized from ethanol to yield 4-(p-bromophenyl)-2-phenyl-5-thiazoleacetic acid.

Repeating the above procedure, to react 4-bromo-4-(3'-furoyl)butyric acid with thiobenzamide, there is obtained 4-(3'-furyl)-4-hydroxy-2-phenyl - 2 - thiazoline-5-propionic acid which is then dehydrated to afford 4-(3'-furyl)-2-phenyl-5-thiazolepropionic acid.

EXAMPLE IV

When the procedure of Examples I–III is repeated to react appropriate 3-acyl-3-haloalkanoic acids with thioamides, the following 4-hydroxy-2-thiazoline-5-alkanoic acids are prepared which are then dehydrated to form their corresponding 5-thiazolealkanoic acid.

| 4-hydroxy-2-thiazoline-5-alkanoic acids | 5-thiazolealkanoic acids |
|---|---|
| 4-hydroxy-4-(2-thienyl)-2-(o-tolyl)-2-thiazoline-5-acetic acid. | 4-(2-thienyl)-2-(o-tolyl)-5-thiazoleacetic acid, M.P. 136–8° C. |
| 2-(p-chlorophenyl)-4-hydroxy-4-(p-methoxyphenyl)-2-thiazoline-5-acetic acid. | 2-(p-chlorophenyl)-4-(p-methoxyphenyl)-5-thiazoleacetic acid, M.P. 199–201° C. |
| 2-(p-chlorophenyl)-4-hydroxy-4-phenyl-2-thiazoline-5-acetic acid. | 2-(p-chlorophenyl)-4-phenyl-5-thiazoleacetic acid, M.P. 153–5° C. |
| 2-(p-chlorophenyl)-4-hydroxy-4-(2-thienyl)-2-thiazoline-5-acetic acid. | 2-(p-chlorophenyl)-4-(2-thienyl)-5-thiazoleacetic acid, M.P. 137–9° C. |
| 4-hydroxy-2,4-bis(p-methoxyphenyl)-2-thiazoline-5-acetic acid. | 2,4-bis(p-methoxyphenyl)-5-thiazoleacetic acid, M.P. 176–8° C. |

| 4-hydroxy-2-thiazoline-5-alkanoic acids | 5-thiazolealkanoic acids |
|---|---|
| 4-hydroxy-4-(p-methoxyphenyl)-2-(o-tolyl)-2-thiazoline-5-acetic acid. | 4-(p-methoxyphenyl)-2-(o-tolyl)-5-thiazoleacetic acid, M.P. 140-1° C. |
| 4-hydroxy-4-phenyl-2-(o-tolyl)-2-thiazoline-5-acetic acid. | 4-phenyl-2-(o-tolyl)-5-thiazoleacetic acid, M.P. 165-7° C. |
| 4-hydroxy-4-phenyl-2-(m-tolyl)-2-thiazoline-5-acetic acid. | 4-phenyl-2-(m-tolyl)-5-thiazoleacetic acid 123-5° C. |
| 4-hydroxy-2-(p-methoxyphenyl)-4-phenyl-2-thiazoline-5-acetic acid. | 2-(p-methoxyphenyl)-4-phenyl-5-thiazoleacetic acid, M.P. 149.5-152° C. |
| 2-(o-chlorophenyl)-4-hydroxy-4-phenyl-2-thiazoline-5-acetic acid. | 2-(o-chlorophenyl)-4-phenyl-5-thiazoleacetic acid, M.P. 168-71° C. |
| 4-hydroxy-4-phenyl-2-(p-tolyl)-2-thiazoline-5-acetic acid. | 4-phenyl-2-(p-tolyl)-5-thiazoleacetic acid, M.P. 170-1° C. |
| 4-hydroxy-2-(1-naphthyl)-4-phenyl-2-thiazoline-5-acetic acid. | 2-(1-naphthyl)-4-phenyl-5-thiazoleacetic acid, M.P. 145-8° C. |
| 4-hydroxy-4-phenyl-2-(α,α,α-trifluoro-m-tolyl)-2-thiazoline-5-acetic acid. | 4-phenyl-2-(α,α,α-trifluoro-m-tolyl)-5-thiazoleacetic acid, M.P. 143-5° C. |
| 4-hydroxy-2-(p-methoxyphenyl)-4-(2-thienyl)-2-thiazoline-5-acetic acid. | 2-(p-methoxyphenyl)-4-(2-thienyl)-5-thiazoleacetic acid, M.P. 149-51° C. |
| 4-hydroxy-2-(2-naphthyl)-4-phenyl-2-thiazoline-5-acetic acid. | 2-(2-naphthyl)-4-phenyl-5-thiazoleacetic acid, M.P. 171-2° C. |
| 4-hydroxy-2-(p-methoxyphenyl)-4-(2-naphthyl)-2-thiazoline-5-acetic acid. | 2-(p-methoxyphenyl)-4-(2-naphthyl)-5-thiazoleacetic acid, M.P. 160-2° C. |
| 2-(p-chlorophenyl)-4-hydroxy 4-phenyl-2-thiazoline-5-propionic acid. | 2-(p-chlorophenyl)-4-phenyl-5-thiazolepropionic acid, M.P. 177-8° C. |
| 4-hydroxy-4-(1-naphthyl)-2-phenyl-2-thiazoline-5-acetic acid. | 4-(1-naphthyl)-2-phenyl-5-thiazoleacetic acid, M.P. 166-7° C. |
| 4-hydroxy-4-(2-naphthyl)-2-phenyl-2-thiazoline-5-acetic acid. | 4-(2-naphthyl)-2-phenyl-5-thiazoleacetic acid, M.P. 168-9° C. |
| 4-hydroxy-2,4-diphenyl-2-thiazoline-5-acetic acid. | 2,4-diphenyl-5-thiazoleacetic acid, M.P. 152-3° C. |
| 4-hydroxy-4-(p-methoxyphenyl)-2-phenyl-2-thiazoline-5-acetic acid. | 4-(p-methoxyphenyl)-2-phenyl-5-thiazoleacetic acid, M.P. 178.5-179.5° C. |
| 4-hydroxy-α-methyl-2,4-diphenyl-2-thiazoline-5-acetic acid. | α-Methyl-2,4-diphenyl-5-thiazoleacetic acid, M.P. 142-4° C. |
| 4-hydroxy-2-phenyl-4-(2'-thienyl)-2-thiazoline-5-acetic acid. | 2-phenyl-4-(2'-thienyl)-5-thiazoleacetic acid, M.P. 134.5-135.0° C. |
| 4-hydroxy-2-phenyl-4-(p-tolyl)-2-thiazoline-5-acetic acid. | 2-phenyl-4-(p-tolyl)-5-thiazoleacetic acid, M.P. 168-9° C. |
| 4-hydroxy-2-(p-methoxyphenyl)-4-phenyl-2-thiazoline-5-propionic acid. | 2-(p-methoxyphenyl)-4-phenyl-5-thiazolepropionic acid, M.P. 174-5° C. |
| 4-hydroxy-4-phenyl-2-(o-tolyl)-2-thiazoline-5-propionic acid. | 4-phenyl-2-(o-tolyl)-5-thiazolepropionic acid, M.P. 107-9° C. |
| 4-hydroxy-2,4-diphenyl-2-thiazoline-5-propionic acid. | 2,4-diphenyl-5-thiazolepropionic acid, M.P. 150° C. |
| 4-hydroxy-2-(o-methoxyphenyl)-4-phenyl-2-thiazoline-5-acetic acid. | 2-(o-methoxyphenyl)-4-phenyl-5-thiazoleacetic acid, M.P. 179-180.5° C. |

EXAMPLE V

A mixture of 190 g. of 3-bromo-3-(p-aminobenzoyl) propionic acid, 70 g. of anhydrous sodium carbonate and 400 ml. of isopropanol are stirred and heated to 60–70° C. The temperature is maintained at this range while 88 g. of thiobenzamide is added in portions. After the addition is completed, the mixture is stirred and heated between 60–70° C. for an additional one-half hour then left standing at room temperature for fifteen hours. The resulting solid is separated and suspended in water. The mixture is filtered to remove 4-(p-anilino)-4-hydroxy-2-2-thiazoline-5-acetic acid. Then the aqueous filtrate is acidified with 4-(p-anilino)-4-hydroxy-2-phenyl-2-thiazoline-5-acetic acid.

The above prepared 4-hydroxy-2-thiazoline-5-acetic acid is refluxed in xylene, in the presence of benzene sulfonic acid, in a flask equipped with a water separator until evolution of water ceases. The mixture is then evaporated to dryness and the residue recrystallized from ethanol to yield 4-(p-anilino)-2-phenyl-5-thiazoleacetic acid.

EXAMPLE VI

Repeating the procedure of the prior examples, the following 4-hydroxy-2-thiazoline-5-alkanoic acids (I) are prepared which are then dehydrated to afford the following 5-thiazolealkanoic acids (II):

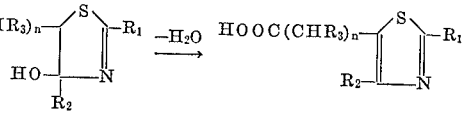

wherein $R_1$, $R_2$, $R_3$ and $n$ are defined as follows:

| $R_1$ | $R_2$ | $R_3$ | $n$ |
|---|---|---|---|
| p-Ethylphenyl | Phenyl | Hydrogen | 2 |
| p-Fluorophenyl | do | do | 0 |
| p-Trifluoromethylphenyl | do | β-Methyl | 2 |
| Phenyl | Furyl | Hydrogen | 1 |
| p-Ethoxyphenyl | p-Ethoxyphenyl | do | 1 |
| Phenyl | p-Iodophenyl | α,β-Dimethyl | 2 |
| p-Butylphenyl | m-Bromophenyl | Hydrogen | 1 |
| p-Nitrophenyl | Phenyl | do | 1 |
| Phenyl | p-Fluorophenyl | α-Ethyl | 1 |
| Dimethylaminophenyl | Phenyl | Hydrogen | 2 |
| p-Anilino | do | β-Propyl | 2 |
| p-Iodophenyl | do | Hydrogen | 1 |
| Phenyl | p-Propylphenyl | do | 1 |
| Do | m-Butylphenyl | do | 1 |
| Do | p-Nitrophenyl | do | 1 |
| Do | Diethylaminophenyl | do | 1 |

What is claimed is:

1. A compound selected from the group consisting of those having the formula:

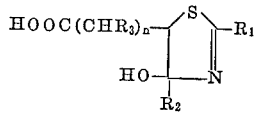

wherein $R_1$ and $R_2$ are selected from the group consisting of phenyl, lower alkylphenyl, lower alkoxyphenyl, halophenyl, di(lower)alkylaminophenyl, nitrophenyl, aminophenyl, trifluoromethylphenyl, thienyl, furyl, and naphthyl; $R_3$ is selected from the group consisting of hydrogen and lower alkyl; and $n$ is an integer from 0 to 2.

2. A compound as described in claim 1 wherein $R_1$ is phenyl; $R_2$ is p-chlorophenyl; and the integer $n$ is 1 which is 4-(p-chlorophenyl)-4-hydroxy-2-phenyl-2-thiazoline-5-acetic acid.

3. A compound as described in claim 1 wherein $R_1$ is phenyl; $R_2$ is p-trifluoromethylphenyl; and the integer $n$ is 1 which is 4-hydroxy-2-phenyl-4-(α,α,α-trifluoro-p-tolyl)-2-thiazoline-5-acetic acid.

References Cited

UNITED STATES PATENTS 2,871,211  1/1959  Mika _____ 260—306.7
3,418,331  12/1968  Yates et al. _____ 260—306.7

ALEX MAZEL, Primary Examiner

R. J. GALLAGHER, Assistant Examiner

U.S. Cl. X.R.

260—302, 332.2, 347.3, 515, 518, 521; 424—270